Patented Feb. 23, 1954

2,670,308

UNITED STATES PATENT OFFICE 2,670,308

MICROGROOVE POLYSTYRENE PHONOGRAPH RECORD

Frazier Groff, Plainfield, and Howard D. Bassett, Bound Brook, N. J., assignors to Union Carbide and Carbon Corporation, a corporation of New York No Drawing. Application April 27, 1950, Serial No. 158,592

3 Claims. (Cl. 117—138.8)

This invention relates to phonograph records of the flat disc type, and more particularly to the type known as microgroove or long playing records which are rotated at turntable speeds of 33⅓ or 45 revolutions per minute.

Heretofore, most phonograph records were designed to operate at a turntable speed of about 78 revolutions per minute. These records had a playing time of about 8 or 9 minutes for a disc having a diameter of 12 inches. In contrast, long-playing type records (33 R. P. M.) of the same disc size have a playing time of about 50 minutes. The increased playing time of the latter is due to the lower playing speed, and the greater number of modulated sound grooves impressed on the record surface, being between 224 and 300 grooves per radial inch as compared to the 96 to 120 grooves of the older or standard 78 R. P. M. records. To accommodate the much larger number of sound grooves on the microgroove type records, the grooves and the wall between successive grooves are necessarily of smaller dimensions than on the standard records, the grooves and walls of the former being less than one-half as wide as with the standard records.

The finer grooves and thinner walls of the microgroove records are highly susceptible to wear by the playback stylus, causing loss of sound fidelity and higher noise level. While microgroove records made from copolymer resins of vinyl chloride and vinyl acetate, such as those sold under the trade-mark "Vinylite," have been sufficiently wear-resistant for commercial acceptance, records molded from unmodified polystyrene were unsatisfactory having a useful playing life of less than 25 playbacks.

More recently, it has been found that modification of a suitable polystyrene resin by dispersing therein a natural wax such as carnauba wax, microcrystalline waxes, beeswax, montan wax and the like, in amounts greater than are normally compatible with the polystyrene, greatly improve the wear-resistance of records molded from such wax-modified polystyrenes. For example, standard 78 R. P. M. records molded from wax-modified polystyrenes have excellent fidelity and low noise levels after as many as 400 playbacks. But, on the other hand, the same polystyrenes when molded into microgroove type records had a commercially satisfactory life of only about 100 to 150 playbacks.

The modification of suitable polystyrene resins with a natural wax to obtain improved phonograph record compositions is the subject matter of a copending application Serial No. 82,908, filed March 22, 1949, by F. Groff et al.

The improved polystyrene compositions described in application Serial No. 82,908 are based on polystyrenes having less than 3 per cent by weight of methanol-soluble matter and an average molecular weight between 40,000 and 150,000 and preferably between 50,000 and 80,000 for optimum suitability as regards moldability, minimum strain content and good wearing performance as a record. In general, the amount of wax dispersed in such polystyrenes is between 2 and 10 per cent by weight thereof, in the instance of waxes which are normally incompatible in polystyrene in amounts more than 1 per cent by weight. Satisfactory dispersion of the wax in the polystyrene to avoid wax sweat-out when the composition is subsequently hot-molded requires intensive and prolonged mixing of the polystyrene and wax at mixing temperatures of at least 160° C. and preferably between 175° C. and 225° C.

It has now been found, that playback needle or stylus wear-resistance of microgroove records molded from the aforedescribed polystyrene resins is materially and unexpectedly increased, when the playing surfaces of such records prior to being initially played are thinly coated with a viscous water-soluble polyethylene glycol or a polyglycerol or glycerol, or mixtures of any of these with each other.

While the increased wear-resistance of the polystyrene microgroove records thus coated may be due to a lubricating effect by these water-soluble substances, on the other hand standard 78 R. P. M. polystyrene records when similarly coated with a water-soluble polyglycol or polyglycerol exhibited substantially no measurable improvement with respect to needle wear. It is also extremely doubtful that the slight amount of polyglycol or the like functions as a plasticizer for the relatively brittle polystyrene, in view of the known insolubility of polystyrene in any of these water-soluble substances.

A factor to be observed in the coating treatment of microgroove polystyrene records is control of applied film thickness of the water-soluble agent. When too much agent is applied to the record grooves, the playback needle, acting as a plow, removes the excess after one or two playings, the excess agent collecting around the needle. For optimum fidelity of sound reproduction, a residual coating thickness in the record grooves between 0.0001–0.0005 inch thickness is preferred.

Control of coating thickness is most readily accomplished by applying the water-soluble agent to the record surface as a dilute solution in a volatile solvent, such as water, methyl alcohol, ethyl alcohol, propyl alcohol. Practically any volatile solvent for the coating material can be used, providing the particular solvent is not a solvent for the polystyrene and does not attack it, as by swelling or decomposition.

A sufficient amount of the water-soluble agent can be deposited on the record surface to obtain a definite improvement in resistance to needle wear by applying to the record surface dilute solutions containing between one and five per cent by weight of the agent, and then allowing the solvent to evaporate.

The solution of water-soluble agent can be applied to the record surface by conventional coating technics, including wiping, brushing, dipping, roller coating and spraying. After application of the solution, the coating can be dried at room temperature. Drying can be accelerated by moderate heating to temperatures not exceeding the thermal distortion point of the record, or about 50° C. After the coating is substantially dry as determined by visual inspection, the record surface may be wiped with a dry cloth to polish the record surface.

The term "dry" is applied in a relative sense to describe the appearance of the coating after evaporation of the volatile solvent, since the useful water-soluble agents such as glycerol and the lower molecular weight polyglycols are viscous, non-volatile liquids at room temperature. However, the amount of such liquid agent remaining on the record surface after evaporation of solvent and wiping is so small that the surfaces appear to be dry. Such "dry" films are substantially analogous in appearance and thickness to the films obtained by polishing and then wiping varnished or lacquered furnitures with a mineral oil type furniture polish. It is considered highly surprising that a film of such minute thickness is relatively permanent under repeated playings, particularly in view of the fact that the average needle exerts a pressure at contact areas in the record grooves equivalent to about 25,000 pounds per square inch in the instance of an unworn stylus, or about 6,000 pounds per square inch after the stylus has been worn enough to increase considerably the total needle surface area in contact with the walls of the record groove. Moreover, it has been reported that temperatures of the order of 2000° F. prevail on the surface of a newly used needle, the temperature subsequently dropping to about 1000° F. after the needle has been worn sufficiently to increase its contact area on the record groove walls.

It is possible that the coatings of water-soluble agents as herein defined, all of which are more or less hygroscopic, absorb water from the atmosphere, and that this is subsequently released by the agent as vapor when momentarily in contact with the hot surface of the needle. The vapor conceivably would have a cooling action on the needle, and perhaps may also function as a gaseous lubricant for the needle minimizing wear of the record groove.

The polyethylene glycols useful for coating polystyrene microgroove records are formed by the reaction of ethylene oxide with an alkylene glycol or an alkylene glycol monoether in the presence of an alkaline catalyst. The reaction is subject to control whereby any degree of polymerization of the reaction product can be obtained. Low molecular reaction products having an average molecular weight between 200 and 700 are viscous liquids at room temperature whereas higher molecular weight polyglycols, for example polyethylene glycols having an average molecular weight of about 900 to 1500 are normally wax-like solids at room temperature having a freezing range between 35° and 45° C. Still higher molecular weight polyglycols are known, having average molecular weights from 3000 to 7500. These are less desirable for coating microgroove records in that the needle tends to scrape off particles of the coating, and these particles, if permitted to remain on the record surface produce noise and distortion when the record is played.

Glycerine and the various polyglycerols are also viscous, hygroscopic liquids at room temperature. The polyglycerols are formed by the intermolecular condensation of glycerol attended by the elimination of water between two or more molecules of glycerol. The reaction is accelerated by heating glycerol to about 280° C. in the presence of catalytic quantities of sodium hydroxide. The usual commercial product is a mixture of isomeric di- and tri-glycerols and is known as "polyglycerols."

The invention is further illustrated in the subsequent examples.

*Example 1*

A microgroove sound record having about 240 modulated soundgrooves per radial inch was made by injection molding a composition comprising the following parts by weight:

100 parts polystyrene (65,000 average molecular weight calculated by the intrinsic viscosity method and less than 2% methanol soluble matter)
3 parts carnauba wax
3 parts microcrystalline wax The above molding composition was injection molded at a pressure of 16,000 pounds per square inch and a molding cylinder temperature of about 260° C. The record was cooled to about 70° C. or mold temperature for discharge from the mold. The playing surface of the record was then coated with a 1% aqueous solution of a polyethylene glycol having a molecular weight between 950 and 1050 and a freezing range between 35° to 40° C. The coated record was then dried at room temperature for about 30 minutes and then polished by wiping with a soft cloth. The wiping treatment developed a smooth, bright surface resistant to finger smudging when handled, but left a significant residue in the grooves of the record which repeated wiping did not remove. The smooth surfaces of the treated record were much more scratch resistant after the treatment, and there was little, if any, tendency for the record to attract and hold dust. Repeated playing of the treated record showed it to be very superior in resistance to needle wear to similar records which had not been treated in this manner. Based on listening tests by qualified observers, the treated records after 200 playings had sound fidelity and noise level equivalent to untreated records after only 75 to 100 playbacks.

*Example 2*

A polystyrene microgroove sound record was molded from the same molding composition described in Example 1. The molded record before being played was coated with an aqueous solution containing 5 parts by weight of the polyethylene glycol described in Example 1, 1 part of a conventional laundry soap containing in admixture sodium stearate, palmitate, laurate, etc., and 94 parts water. The presence of soap in the aqueous solution facilitated wetting of the polystyrene surface to obtain a smoother coating. After the coating was dried, the record surface was polished by brisk rubbing with a flannel cloth. The record was then played in an automatic record player and exhibited substantially the same performance as regards noise level and sound fidelity as described for the record of Example 1.

Similar improved resistance to wear was observed in microgroove polystyrene records which were coated in the same manner described in Example 1 or 2, with commercial polyethylene glycols having average molecular weights of 190–200, 380–420, 570–630, and with glycerol and polyglycerols.

The polystyrene composition can contain dyes or pigment for coloring, and finely divided fillers such as slate flour, carbon black, diatomaceous earth and the like. The fillers reduce the cost of the composition and tend to increase the wear resistance when the records are played with poorly shaped needles.

What is claimed is:

1. Molded polystyrene microgroove record having a thin coating on its playing surface comprising a water-soluble agent selected from the group consisting of glycerol, polyglycerol and polyethylene glycols, the coating in the record grooves being between about 0.0001 and 0.0005 inch thickness, said playing surface comprising a polystyrene having an average molecular weight between 40,000 and 150,000 and a methanol-soluble content of less than 3% by weight, said polystyrene having dispersed therein a more than compatible amount of a natural wax, said amount being between about 2 and 10% by weight of the polystyrene.

2. Microgroove record comprising a playing surface of polystyrene having an average molecular weight between 50,000 and 80,000 and less than 3% by weight of methanol soluble matter and dispersed in said polystyrene between 2 and 10% by weight thereof of natural wax, said record having a thin coating on its playing surface comprising a water-soluble agent selected from the group consisting of glycerol, polyglycerol and polyethylene glycols, the coating in the record grooves being between about 0.0001 and 0.0005 inch thickness.

3. Microgroove record comprising a playing surface of polystyrene having an average molecular weight between 50,000 and 80,000 and less than 3% by weight of methanol soluble matter and dispersed in said polystyrene between 2 and 10% by weight thereof of natural wax, said record having a thin coating on its playing surface comprising a polyethylene glycol having an average molecular weight between 190 and 1500, the coating in the record grooves being between about 0.0001 and 0.0005 inch thickness.

FRAZIER GROFF.
HOWARD D. BASSETT.

References Cited in the file of this patent

UNITED STATES PATENTS

| Number | Name | Date |
|---|---|---|
| 1,493,952 | Biglow | May 13, 1924 |
| 1,887,021 | Henderson | Nov. 8, 1932 |
| 2,184,524 | Hofmann | Dec. 26, 1939 |
| 2,393,863 | Myers | Jan. 29, 1946 |
| 2,446,928 | Hodgdon | Aug. 10, 1948 |
| 2,464,060 | Rowe et al. | Mar. 8, 1949 |